United States Patent [19]

Sakanishi et al.

[11] Patent Number: 4,939,769
[45] Date of Patent: Jul. 3, 1990

[54] CORDLESS TELEPHONE SYSTEM

[75] Inventors: Masayuki Sakanishi, Tokyo; Koichi Ito, Hino; Isao Sasaki, Hachioji, all of Japan

[73] Assignee: Kabushiki Kaisha Toshiba, Kawasaki, Japan

[21] Appl. No.: 216,685

[22] Filed: Jul. 8, 1988

[30] Foreign Application Priority Data

Jul. 10, 1987 [JP] Japan .................. 62-173325

[51] Int. Cl.$^5$ .............................. H04Q 7/04
[52] U.S. Cl. ........................... 379/61; 379/62
[58] Field of Search ................. 379/58-63, 379/161, 184, 189

[56] References Cited

U.S. PATENT DOCUMENTS

| | | | |
|---|---|---|---|
| 3,941,943 | 3/1976 | Matheny | 379/161 |
| 4,075,434 | 2/1978 | Merritt, Jr. | 378/161 |
| 4,218,590 | 8/1980 | Rasmussen et al. | 379/161 |
| 4,291,199 | 9/1981 | Densmore et al. | 379/161 |
| 4,468,539 | 8/1984 | Schober | 379/61 |
| 4,639,549 | 1/1987 | Hirayama et al. | 379/62 |
| 4,640,987 | 2/1987 | Tsukada et al. | 379/61 |
| 4,650,931 | 3/1987 | Tsukada et al. | 379/61 |
| 4,706,274 | 11/1987 | Baker et al. | 379/61 |
| 4,805,210 | 2/1989 | Griffith, Jr. | 379/184 |
| 4,809,317 | 2/1989 | Howe et al. | 379/184 |

FOREIGN PATENT DOCUMENTS 4761806 8/1988 Japan ....................... 379/61

Primary Examiner—Robert Lev
Attorney, Agent, or Firm—Finnegan, Henderson, Farabow, Garrett, and Dunner

[57] ABSTRACT

A cordless telephone system which allows, in addition to outside-line communication, extension communication between wire and wireless telephone sets and also which can prevent wiretapping of communication contents during the outside-line communication. The system comprises a first switch connecting a connection unit to a wire telephone circuit, a connector connecting the wire telephone set to a connection-unit terminal of the first switch, a second switch switchingly controlled by the connection unit to supply a predetermined DC current to the connection-unit terminal of the first switch, and a DC power source for outputting the predetermined DC current. Further provided in the system, in addition to the above arrangement, are a third switch connected as inserted between the connection-unit terminal of the first switch and a voice circuit of the connection unit and a fourth switch connected as inserted between the connection-unit terminal of the first switch and the connector.

13 Claims, 4 Drawing Sheets

CORDLESS TELEPHONE SYSTEM

BACKGROUND OF THE INVENTION

1. Field of the Invention

The present invention relates to a cordless telephone system which comprises a connection unit connected to a wire telephone circuit and a wireless or radio telephone set connected through a radio communication line to the connection unit and, more particularly, to a cordless telephone system which allows extension speech or communication between a wire telephone set connected to the connection unit and a wireless telephone set.

2. Description of the Related Art

A conventional cordless telephone system, as shown in FIG. 4, comprises a connection unit 1 and a radio telephone set 2. A wire telephone set 3 is connected if necessary to connection unit 1 through such a connector as a rosette to allow the communiation of a wire telephone circuit 4 with the wire or wireless telephone set 3 or 2.

The radio telephone set 2 is connected through a radio communication circuit to the connection unit 1 and the operation thereof will be summarized in the following.

First, a signal sent from the wire telephone circuit 4 is supplied through a hybrid circuit 5 and a base band circuit 6 to a radio frequency unit 7 as its modulation oinput. The hybrid circuit 5 contains a line switch for DC loop formation.

Radio waves modulated at the radio frequency unit 7 are transmitted from an antenna 8 to the radio telephone set 2.

Radio waves emitted from an antenna 9 of the radio telephone set 2, on the other hand, are received by the antenna 8 of the connection unit 1 to be demodulated at the radio frequency unit 7. A demodulated signal is sent to the wire telephone circuit 4 through the base band circuit 6 and the hybrid circuit 5. During the above operation, a control circuit 10 incorporated in the connection unit 1 performs radio interconnection control between the connection unit 1 and the radio telephone set 2 as well as radio channel control of the radio frequency unit 7.

The radio telephone set 2, which, like the connection unit 1, includes the antenna 9, a base band circuit 11, a radio frequency unit 12 and a control circuit 13, is arranged so that a signal received at the antenna 9 is sounded from a receiver of a handset of the telephone set 2. A user's voice inputted from a transmitter 15 of the handset of the telephone set 2 is sent to the base band circuit 11 and then to the radio frequency unit 12 as its modulation input to be transmitted from the antenna 9. A loud speaker 16 acts as a sounder which generates a ringing tone when the telephone set 2 receives a call transmitted from the wire telephone circuit 4. When a 16-Hz detecting circuit 18 of the connection unit 1 detects the ringing signal of 16 Hz sent from the wire telephone circuit 4, this causes the control circuit 10 to transmit the received call signal from the antenna 8. The radio telephone set 2, when receiving the received call signal at the antenna 9, transmits an answer signal to the received call signal, from the antenna 9 back to the connection unit 1, and at the same time the control circuit 13 orders the loud speaker 16 to generate a ringing tone.

If the antenna 8 of the connection unit 1 fails to catch the received-call answer signal from the radio telephone set 2, then the connection unit 1 judges that the radio telephone set 2 has failed in the connection of the received call and orders a loud speaker 17 incorporated in the connection unit 1 to generate a ringing tone, prompting the user to answer the wire telephone set 3.

When the radio telephone set 2 is used at a location relatively apart from the connection unit 1, it is often desired to perform an extension communication between the wire and wireless telephone sets 3 and 2.

Such a conventional cordless telephone system as described above, in which the wire telephone set 3 is connected merely in parallel to the connection unit 1, has had a problem that the system permits only three-party communication including a party at the end of the wire telephone circuit 4 through an exchange (not shown). In addition, the telephone system has also been defective in that, during outside-line communication of one of the wire and wireless telephone sets 3 and 2 with a party at the other side of the exchange, if a user of the other telephone set picks up the handset to put the phone in its off-hook state, then the user of the other telephone set can listen in or wiretap the speech through the handset.

OBJECT AND SUMMARY OF THE INVENTION

It is a first object of the present invention to provide a cordless telephone system which enables extension communication between wire and wireless telephone sets, in addition to exterior- or outside-line communication.

It is a second object of the present invention to provide a cordless telephone system which enables both outside-line and extension commmunications and which also can prevent wiretapping of speech contents during the outside communication.

In accordance with the present invention, the first object is attained by providing a cordless telephone system which comprises a wireless telephone set, a connection unit connected to a wire telephone circuit for performing interconnection control between the wire telephone circuit and the wireless telephone set, a wire telephone set connected directly to the connection unit, extension-communication request generating means for generating an extension communication request, a DC power source, disconnecting means for disconnecting the wire telephone circuit from the connection unit in response to the extension communication request, power supply means for supplying power from the DC power source to the connection unit in response to the extension communication request, and means for establishing an extension communication path between the wire and wireless telephone sets through the connection unit in response to the extension communication request.

Further, the second object is attained by providing a cordless telephone system which comprises, in addition to the above arrangement, inhibiting means for selectively inhibiting the operation of either one of the wireless and wire telephone sets in the extension communication mode.

In accordance with the first invention, in addition to both the outside-line communication between the wire telephone circuit and the wire telephone set connected in parallel to the connection unit and the outside-line communication between the wireless telephone set and the wire telephone circuit, the extension communication between the wire telephone circuit and the wireless telephone set can be achieved. Further, according to the second invention, during the outside communication of one of the wire and wireless telephone sets, the conversation of one telephone set can be prevented from being wiretapped by the other telephone set, in addition to the aforementioned extension communication function.

DESCRIPTION OF THE PREFERRED EMBODIMENTS

Figure 1:
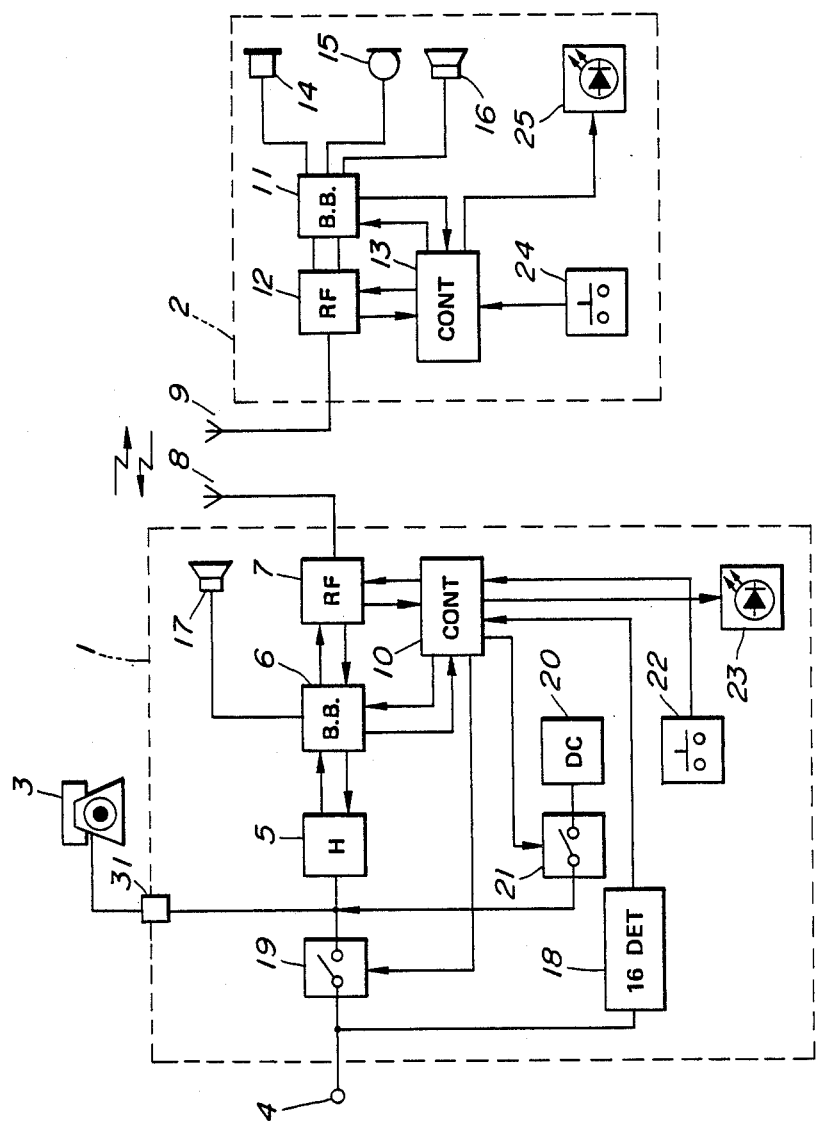
FIG. 1 is a block diagram showing a first embodiment of a cordless telephone system according to the present invention.
Figure 4:
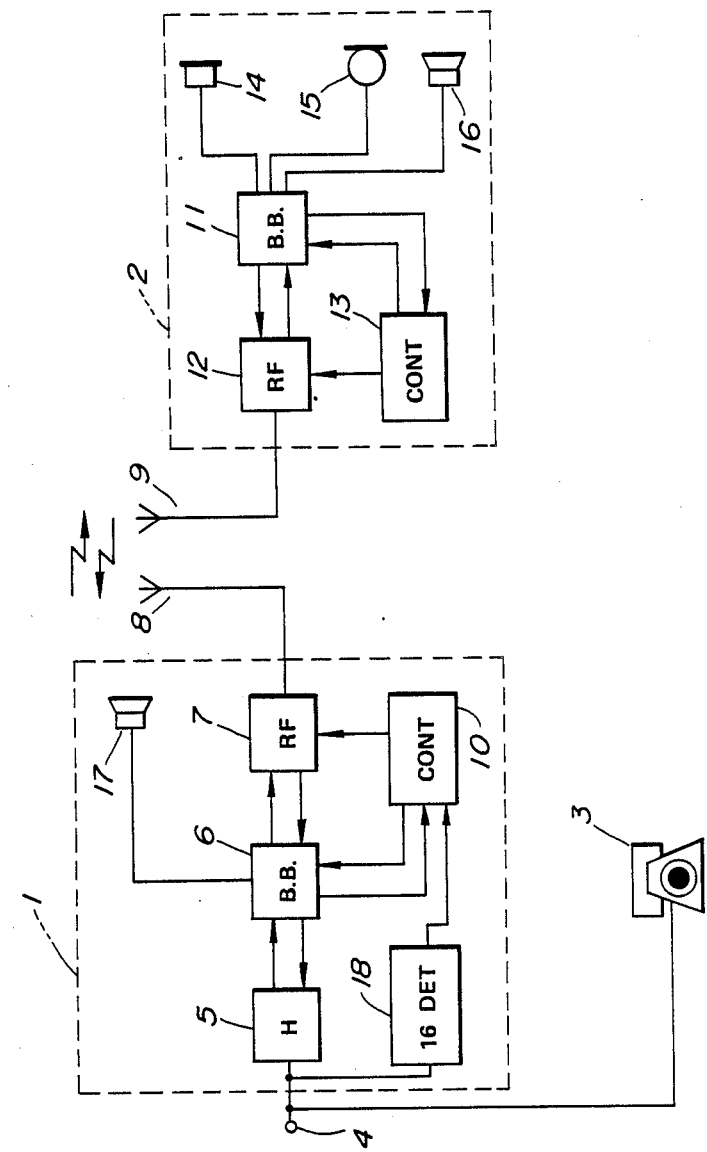
FIG. 4 is a block diagram showing an arrangement of a prior art cordless telephone system.

Referring to FIG. 1, there is shown a block diagram of a cordless telephone system according to an embodiment of the present invention, in which, unlike the prior art arrangement, a relay switch 19, a DC power supply 20, a switch 21, an extension calling switch 22 and an extension communication indicator lamp 23 are newly added in the connection unit 1, the wire telephone set 3 being connected to a junction between the relay switch 19 and the hybrid circuit 5 through a modular connector 31. On the other hand, newly added in the wireless telephone set 2 are an extension calling switch 24 and an extension communication indicator lamp 25, in addition to the prior art arrangement. In FIG. 1, the same parts as those in FIG. 4 are denoted by the same reference numerals.

The normally-closed relay switch 19 and the switch 21 are controlled by the control circuit 10 with respect to their switching operations, and the switch 21 for supply of a DC current is normally opened. Accordingly, the connection unit 1 and the wire telephone set 3 are normally connected to the wire telephone circuit 4 so that a call can be issued from both sides of the wireless telephone set 2 and the wire telephone circuit 4. In the case where the telephone system receives a call through the wire telephone circuit 4 from the side of a not shown exchange, a user located near any one of the wireless and wire telephone sets 2 and 3 can pick up to put the nearby telephone set in the off-hook state and to enter into the outside-line conversation with a party at the end of the exchange. When the outside-line interconnection is established for calling or call reception, the wireless telephone set 2 can get into conversation with a party at the end of the wire telephone circuit 4. That is, the present system enables communication among three persons including the speech party at the end of the exchange.

Where the switch 21 is in its closed state, if the wire telephone set 3 is put in the off-hook state to establish a closed loop with respect to the exchange through the wire telephone circuit 4 for preparation of the interconnection, then the off-hook operation of the wireless telephone set 2 causes the telephone set 2 to only receive a busy tone back from the connection unit 1, so that the extension communication between the wireless and wire telephone sets 2 and 3 cannot be established. This explanation is also applied similarly to the case where the wireless and wire telephone sets 2 and 3 are reversely operated.

When it is desired to obtain the extension communication between the wireless and wire telephone sets 2 and 3, the user turns ON the extension calling switch 24 of the wireless telephone set 2. This causes an extension calling signal to be transmitted from the control circuit 13 through the radio circuit 12 to the antenna 9 to be radiated from the antenna. The connection unit 1, when receiving the extension calling signal at the antenna 8, sends the signal to the control circuit 10 via the radio circuit 7. The control circuit 10 outputs a control command for generating the extension-call indicator tone from the loud speaker 17 via the base band circuit 6, a control command for opening the switch 19, and a control command for closing the switch 21 to supply DC power to the extension system.

As a result, the wire telephone set 3 is disconnected from the wire telephone circuit 4 and connected only to the hybrid circuit 5, in which case DC power is supplied through the switch 21 to the wire telephone set 3.

Under such a condition, if the user picks up the handset of the wire telephone set 3, i.e., hooks off the telephone set 3, the connection unit 1 sends an answer signal from the antenna 8 to the wireless telephone set 2, thus putting the system in an extension communicatable state. At the same time, the extension communication indicator lamps 23 and 25 are lit up, informing the user that the system is in the extension communication mode and stopping the generation of the extension-call indicator tone from the loud speaker 17. In the case where the wire telephone set 3 is kept in the off-hook state and no answer signal is transmitted, the off-hook operation of the wireless telephone set 2 causes the connection unit 1 to disconnect the radio coupling line, open the switch 21 and further close the switch 19, whereby the extension-call indicator tone, which has been sounded from the loud speaker 17, is stopped and the system is returned to its normal outgoing/incoming call await mode.

When an extension call from the wire telephone set 3 is desired, the user hooks off the telephone 3 and turns ON the extension calling switch 22 of the connection unit 1. This causes the control circuit 10 to open the switch 19 and close the switch 21 to thereby transmit the extension calling signal from the antenna 8. The radio telephone set 2, when receiving the extension calling signal at the antenna 9, generates the extension-call indicator tone from the loud speaker 16. A user's off-hook operation of the telephone set in response to the extension-call indicator tone causes the antenna 9 to transmit a received-signal answer signal, which results in the extension communication between the wireless and wire telephone sets 2 and 3 being achieved and the extension communication inidcator lamps 23 and 25 being lit up to indicate that the system is in the extension communication mode. The user's off-hook operation also causes the stoppage of the extension-call indicator tone which has been generated from the loud speaker 16. In the case where the wireless telephone set 2 is not in the off-hook state, if the wire telephone set 3 is put in the on-hook state then the connection unit 1 disconnects the radio communication line between the wire and wireless telephone sets 3 and 2, opens the switch 21, closes the switch 19 and further stops the extension-call indicator tone which has been generated from the loud speaker 16 of the wireless telephone set 2, thus returning to the normal outgoing/incoming call await mode.

A call inputted from the outside line to the connection unit 1 during the extension communication is sensed by the 16-Hz detector 18 so that the loud speaker 17 issues an extension-call indicator tone informing the user of the presence of a call incoming from the outside line. In this case, user's depression of the extension calling switch of the connection unit 1 or the radio telephone set 2 causes the control circuit 10 to open the switch 21 and close the switch 19, thereby putting the system in an extension communicatable state.

As has been explained in the foregoing, when the switch 19 is set at a normally closed position and the switch 21 is set at a normally opened position, the connection unit 1 and the wire telephone set 3 are connected in parallel to the wire telephone circuit 4 to put the system in the outgoing/incoming call await mode. In this mode, the extension communication as well as the three-party communication among the outside-line party, the wireless and wire telephone sets 2 and 3 can be achieved, but the extension communication cannot be achieved.

In the outgoing/incoming call await mode, if the extension calling switch 24 of the radio telephone set 2 is turned ON or the wire telephone set 3 is put in the off-hook state and the extension calling switch 22 of the connection unit 1, then the switch 19 is opened and the switch 21 is closed to make ready for the extension communication, so that the off-hook operation of one of the telephone sets which has received the extension-call indicator tone enables the extension communication.

Figure 2:
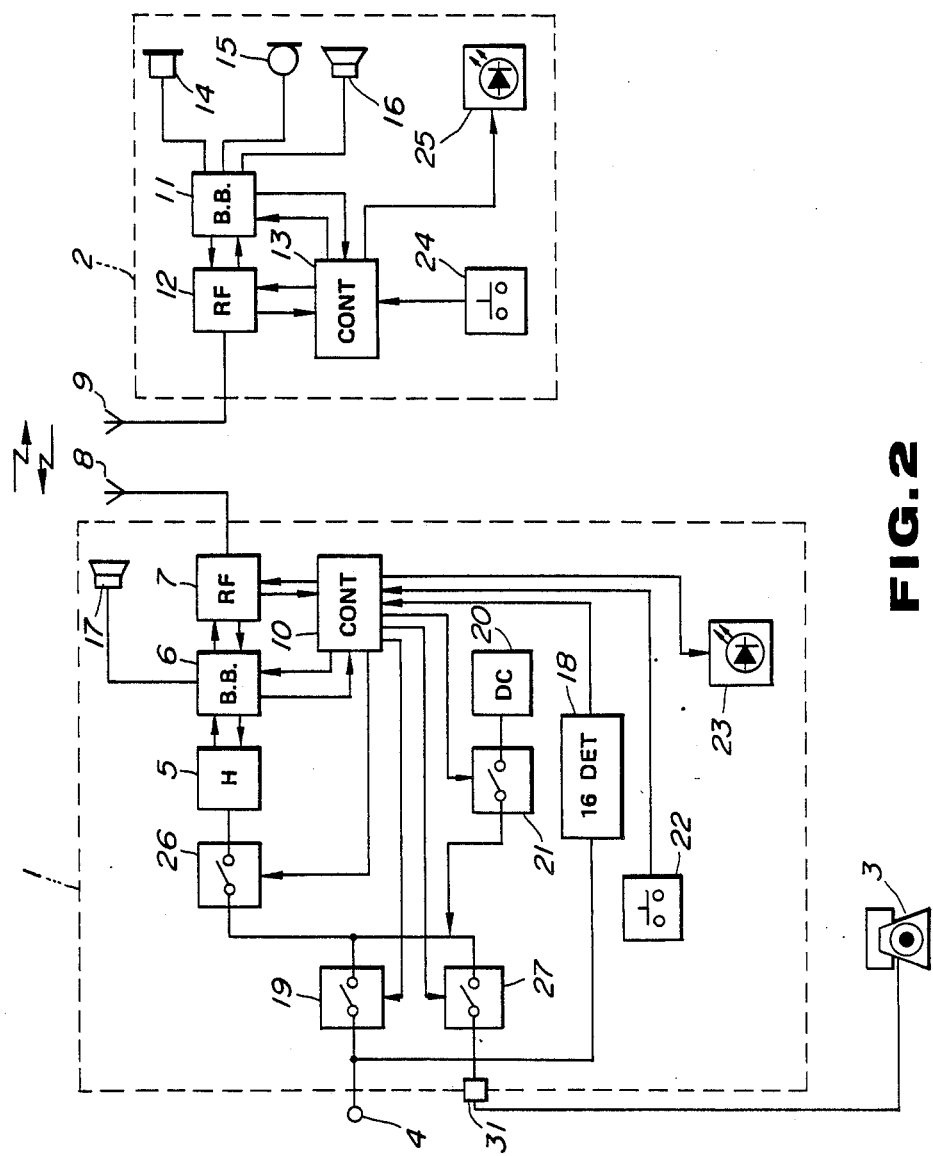
FIG. 2 is a block diagram showing a second embodiment of the cordless telephone system according to the present invention.

Shown in FIG. 2 is a block diagram of a second embodiment of the present invention, wherein switches 26 and 27 are newly added in addition to the embodiment of FIG. 1. More specifically, the switch 26 is provided between the switch 19 for connection of the wire telephone circuit 4 and the hybrid circuit 5 in FIG. 1, while the switch 27 is provided between the switch 19 and the wire telephone set 3, these switches 26 and 27 being controlled by the control circuit 10.

With such an arrangemet, the switches 19, 26 and 27 are normally set at their closed positions in the outgoing/incoming call await mode. If the wireless telephone set 2, when giving a call or receiving a call, is put in the outside-line communicatable state, the control circuit 10 detects that the connection unit 1 and the wireless telephone set 2 are in communication and opens the switch 27. As a result, during the outside line communication of the wireless telephone set 2, wiretapping of the wireless telephone set 2 through the wire telephone set 3 becomes impossible because the wire telephone set 3 is connected in parallel to the wire telephone circuit 4 through the switch 19. However, when it is desired to transfer the outside line call to the wire telephone set 3 during the outside line communication of the wireless telephone set 2, a user's turning ON operation of the extension calling switch 24 of the wireless telephone set 2 causes transmission of the extension calling signal from the antenna 9. The connection unit 1, when receiving this extension calling signal at the antenna 8, causes the control circuit 10 to output a command for generating the extension-call indicator tone from the loud speaker 17 and a command for closing the switch 27. The user's off-hook operation of the wire telephone set 3 in response to the extension-call indicator tone causes the control circuit 10 to stop the indicator tone, transmit a received-signal answer sigal to the wireless telephone set 2 and light up the extension communication indicator lamps 23 and 25, thus enabling the three-party communication with the outside line. The on-hook operation of the wireless telephone set 2 in the three-party communication mode causes the control circuit 10 to open the switch 26 and issue commands for putting out the extension communication indicator lamps 23 and 25, with the result that the radio communication circuit between the connection unit 1 and the wireless telephone set 2 is cut off to complete the outside-line communication transfer from the wireless telephone set 2 to the wire telephone set 3. At this stage, since the switch 26 is opened, it is impossible to wiretap the outside-line speech of the wire telephone set 3 through the wireless telephone set 2. The on-hook operation of the wire telephone set 3 causes the termination of the outside line communication, with the result that the switches 19 and 26 are all closed to put the system in the outgoing/incoming call await mode.

When the control circuit 10 detects, in the outside-line communication mode of the wire telephone set 3, on the basis of issuance or reception of a call that there is no radio communication coupling between the connection unit 1 and the wireless telephone set 2, the control circuit 10 issues a commane for opening the switch 26, whereby the wireless telephone set 2 cannot listen in the outside-line speech of the wire telephone set 3.

When it is desired to transfer the outside-line speech to the wireless telephone set 2 during the outside-line communication of the wire telephone set 3, the turning ON of the extension calling switch 22 of the connection unit 1 enables the transmission of the extension calling signal from the antenna 8. The wireless telephone set 2 receiving the extension calling signal from the antenna 9 causes the loud speaker 16 to generate the extension-call indicator tone. If the user of the wireless telephone set 2 hooks off the telephone in response to the call indicator tone, the control circuit 13 stops the indicator tone that has been generated from the loud speaker 16, lights up the extension communication indicator lamp 25, and at the same time transmits the received-signal answer signal from the antenna 9. The connection unit 1, when receiving the received-signal answer signal from the antenna 8, causes the switch 26 to be closed and at the same time the extension communication indicator lamp 23 to be lit up, thus enabling the three-party communication among the outside-line party, the wireless and wire telephone sets 2 and 3.

In the three-party communication mode, the operation of the extension calling switch 22 of the connection unit 1 causes the opened switch 27 and the put-out extension communication indicator lamps 23 and 24, which results in the completion of transfer of the outside-line communication from the wire telephone set 3 to the wireless telephone set 2. And if the user of the wireless telephone set 2 finishes his conversation and replaces its handset to put the telephone in the on-hook state, then the control circuit 10 breaks the radio communication line between the connection unit 1 and the wireless telephone set 2 and closes the switch 27 to return the system to the outgoing/incoming call await state.

In the call await mode, the user's off-hook operation of the wire telephone set 3 causes the wire telephone set 3 to establish an exchange/closed loop together with the wire telephone circuit 4, so that even the off-hook operation of the wireless telephone set 2 results in that the wireless telephone set 2 can only receive a busy tone emitted from the connection unit 1 and cannot be connected to the outside line. This explanation holds true for the case where the wireless and wire telephone sets 2 and 3 are operated in reverse order of the above case.

In the outgoing/incoming call await mode, if the user of the wire telephone set 3 picks up its handset to put the telephone in the off-hook state and turns ON the extension calling switch 22, then the conection unit 1 transmits the extension calling signal from the antenna 8, opens the switch 19 and closes the switch 21 to prepare for the extension communication. The wireless telephone set 2, when receiving the extension calling signal at the antenna 9, causes the loud speaker 16 to generate the extension call indicator tone. The user's off-hook operation of the wireless telephone set 2 in response to the extension call indicator tone causes the control circuit 13 to stop the extension call indicator tone that has been generated from the loud speaker 16, light up the extension communication indicator lamp 25, and transmit the received-signal answer signal from the antenna 9. The connection unit 1 receiving the received-signal answer signal from the antenna 8 causes the illumination of the extension speed indicator lamp 23 with the extension communicatable mode. However, if the user of the wireless telephone set 2 does not answer to the extension call indicator tone and thus the wireless telephone set 2 is not put in the off-hook state, then the on-hook operation of the wire telephone set 3 causes the control circuit 10 to open the switch 21, close the switch 19 and further stop the extension call indicator tone being emitted from the loud speaker 16, thereby putting the system in the outgoing/incoming call await mode.

In the call await mode, the turning on of the extension calling switch 24 of the wireless telephone set 2 results in the transmission of the extension calling signal from the antenna 9 of the wireless telephone set 2. The connection unit 1, when receivinng the extension calling signal, allows the generation of the extension call indicator tone from the loud speaker 17, the opening of the switch 19, and the closing of the switch 21. If the user of the wire telephone set 3 picks up its handset to put the telephone in the off-hook state in response to the call indicator tone, then the control circuit 10 stops the extension call indicator tone being emitted from the loud speaker 17, lights up the extension communication indicator lamp 23, and transmits the received-signal answer signal from the antenna 8. The reception of the answer signal from the antenna 9 by the wireless telephone set 2 causes the extension communication indicator lamp 25 to be lit up with extension communicatable mode. When the user of the wire telephone set 3 does not answer to the extension call indicator tone, the on-hook operation of the wireless telephone set 2 causes the switches 21 and 19 to be controllably opened and closed respectively and the extension call indicator tone from the loud speaker 17 to be stopped, thus returning the system to the outgoing/incoming call await mode.

Such an arrangement enables the achievement of the extension communication between the wire and wireless telephone sets 3 and 2 connected in parallel to the same wire telephone circuit 4, the prevention of wiretapping of one of the telephones during outside-line communication of the other telephone, and further the transfer of the outside-line communication to one telephone during the outside-line communication of the other telephone.

Figure 3:
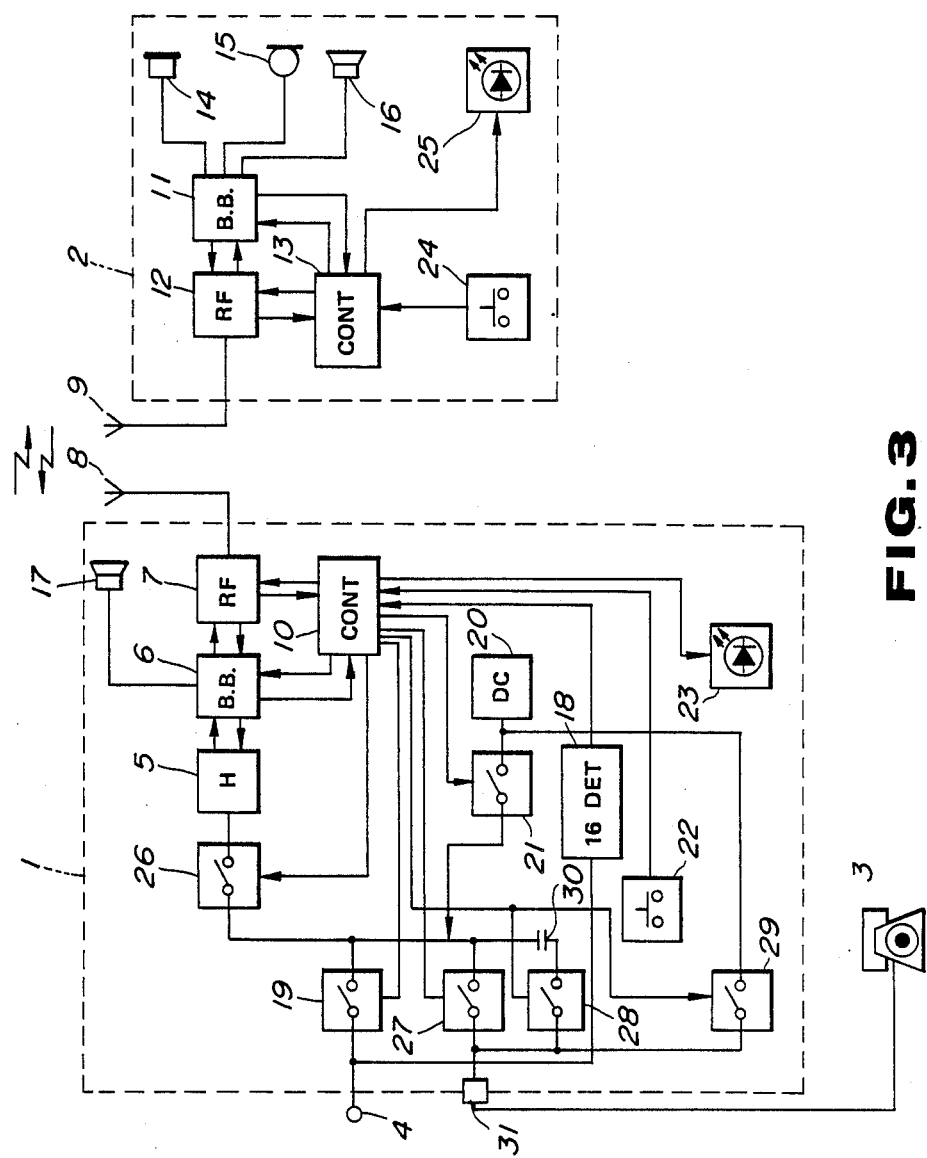
FIG. 3 is a block diagram showing a third embodiment of the cordless telephone system according to the present invention.

There is shown in FIG. 3 a third embodiment of the present invention, in which switches 28 and 29 and a capacitor 30 are newly provided in addition to the arrangement of FIG. 2 so that, when it is desired for the wire and wireless telephone sets 3 and 2 to make conversation simultaneously with the party at the end of the wire telephone circuit 4, the switches 19, 26, 28 and 29 to be turned ON. This allows the wire telephone set 3 to be supplied with a DC current from the DC power supply 20, whereby a current sent from the wire telephone circuit 4 is supplied only to the connection unit 1. As a result, even the simultaneous use of the both telephones causes no attenuation of the current supplied from the wire telephone circuit 4 and even the long wire telephone line causes no large voltage drop, so that the telephone conversation can be realized at an optimum voice level. This explanation is similarly applied to the case where DC current is supplied from the DC power supply 20 to the connection unit 1. In this case, it becomes more effective when the gain of the base band circuit 6 is controlled to increase the volume level of the voice under the control of the control circuit 10.

What is claimed is:

1. A cordless telephone system comprising:
   a wireless telephone set;
   a connection unit connected to a wire telephone circuit for performing interconnection control between a wire telephone line and said wireless telephone set;
   a wire telephone set connected directly to said connection unit;
   extension-communication request generating means for generating an extension communication request;
   a DC power source;
   disconnecting means for disconnecting said wire telephone circuit from said connection unit in response to said extension communication request;
   power supply means for supplying power from said DC power source to said connection unit in response to said extension communication request;
   inhibiting means for selectively inhibiting operation of either one of said wireless and wire telephone sets; and
   means for establishing an extension communication path between said wire and wireless telephone sets through said connection unit in response to said extension communication request.

2. A cordless telephone system as set forth in claim 1, wherein said extension communication request generating means includes and extension calling switch provided in said connection unit which switch generates said extension communication request when operated.

3. A cordless telephone system as set forth in claim 1, wherein said extension communication request generating means includes an extension calling switch provided in said wireless telephone set which switch generates said extension communication request when operated.

4. A cordless telephone system as set forth in claim 1, wherein said disconnecting means includes first switch means which is turned OFF in response to said extension communication request to disconnect said wire telephone circuit from said connection unit.

5. A cordless telephone system as set forth in claim 1, wherein said power supply means includes second switch means which is turned ON in response to said extension communication request to establish a power supply path between said DC power source and said connection unit.

6. A cordless telephone system as set forth in claim 1, further comprising means for displaying an extension communication mode.

7. A cordless telephone system as set forth in claim 6, wherein said display means is provided in each of said connection unit and said wireless telephone set.

8. A cordless telephone system as set forth in claim 1, wherein said inhibiting means includes third switch means which is turned OFF in an outside-line communication mode of said wire telephone set to inhibit operation of said connection unit.

9. A cordless telephone system as set forth in claim 1, wherein said inhibiting means includes fourth switch means which is turned OFF in an outside-line communication mode of said wireless telephone set to disconnect said wire telephone set from said connection unit.

10. A cordless telephone system as set forth in claim 1, further comprising power supply switching means for inhibiting power supply from said wire telephone circuit to said wire telephone set and for supplying power from said DC power source to said wire telephone set.

11. A cordless telephone system as set forth in claim 10, wherein said power supply switching means is operated in a three-party communication mode in which both of said wire and wireless telephone sets perform outside-line communication at the same time.

12. A cordless telephone system comprising:
a wireless telephone set;
a connection unit connected to a wire telephone circuit for performing interconnection control between a wire telephone line and said wireless telephone set;
a wire telephone set connected directly to said connection unit;
extension-communication request generating means for generating an extension communication request;
a DC power source;
first switch means for disconnecting said wire telephone circuit from said connection unit in response to said extension communication request;
second switch means for supplying power from said DC power source to said connection unit in response to said extension communication request;
means for establishing an extension communication path between said wire and wireless telephone sets through said connection unit in response to said extension communication request;
third switch means for supplying a signal of said wire telephone circuit to said wire telephone set through said DC component blocking means; and
fourth switch means for establishing a power supply path between said DC power source and said wire telephone set.

13. A cordless telephone system comprising:
a connection unit connected to a wire telephone circuit;
a wireless telephone set connected through a wireless circuit to said connection unit for performing communication with a wire telephone circuit under connection control of said connection unit;
first switch means for connecting and disconnecting said connection unit to and from said wire telephone circuit;
connector means for connecting a wire telephone set to a connection-unit terminal of said first switch means;
second switch means for supplying a predetermined DC current to said connection-unit terminal of said first switch means;
a DC power source for outputting said predetermined DC current;
third switch means connected between the connection-unit terminal of said first switch means and said connection unit;
fourth switch means connected between the connection-unit terminal of said first switch means and said connector means; and
control means for controlling extension communication between said wire and wireless telephone sets, outside-line communication between said wire telephone set and said wire telephone circuit, outside-line communication between said wireless telephone set and said wire telephone circuit, and three-party communication between said wire and wireless telephone sets and said wire telephone circuit under switching control of said first, second, third, and fourth switch means and also for controlling to connect only one of said wireless and wire telephone sets to said wire telephone circuit in said outside-line communication mode under switching control of said third and fourth switch means.

* * * * *

UNITED STATES PATENT AND TRADEMARK OFFICE
CERTIFICATE OF CORRECTION

PATENT NO. : 4,939,769
DATED : July 03, 1990
INVENTOR(S) : Masayuki Sakanishi et al.

It is certified that error appears in the above-identified patent and that said Letters Patent is hereby corrected as shown below:

Claim 2, Col. 8, line 52, "and" should be --an--.

Signed and Sealed this

Nineteenth Day of January, 1993

*Attest:*

DOUGLAS B. COMER

*Attesting Officer*     *Acting Commissioner of Patents and Trademarks*